United States Patent
Bergman et al.

(10) Patent No.: US 10,378,371 B2
(45) Date of Patent: Aug. 13, 2019

(54) ANTI-ROTATION VANE

(71) Applicant: United Technologies Corporation, Farmington, CT (US)

(72) Inventors: Russell J. Bergman, Windsor, CT (US); Thurman Carlo Dabbs, Dover, NH (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 791 days.

(21) Appl. No.: 14/965,501

(22) Filed: Dec. 10, 2015

(65) Prior Publication Data

US 2016/0208629 A1   Jul. 21, 2016

Related U.S. Application Data

(60) Provisional application No. 62/093,835, filed on Dec. 18, 2014.

(51) Int. Cl.
*F01D 9/04* (2006.01)
*F01D 25/24* (2006.01)
*F01D 11/08* (2006.01)
*F01D 21/00* (2006.01)

(52) U.S. Cl.
CPC .............. *F01D 9/041* (2013.01); *F01D 11/08* (2013.01); *F01D 21/003* (2013.01); *F01D 25/246* (2013.01); *F05D 2220/32* (2013.01); *F05D 2240/12* (2013.01); *F05D 2240/80* (2013.01); *F05D 2260/30* (2013.01)

(58) Field of Classification Search
CPC ........ F01D 9/041; F01D 11/08; F01D 21/003; F01D 25/246; F05D 2200/32; F05D 2240/12; F05D 2240/80; F05D 2260/30
USPC ...................................... 415/209.3
See application file for complete search history.

(56) References Cited

U.S. PATENT DOCUMENTS

| | | | | |
|---|---|---|---|---|
| 3,362,160 | A | * | 1/1968 | Bourgeois ............. F01D 21/003 415/118 |
| 4,142,827 | A | | 3/1979 | Vinciguerra |
| 4,687,413 | A | * | 8/1987 | Prario ..................... F01D 11/08 403/319 |
| 4,808,069 | A | | 2/1989 | Bonner et al. |
| 4,856,963 | A | * | 8/1989 | Klapproth ............... F01D 9/042 415/189 |

(Continued)

FOREIGN PATENT DOCUMENTS

| | | |
|---|---|---|
| EP | 1041249 | 10/2000 |
| EP | 1104836 | 6/2001 |

(Continued)

OTHER PUBLICATIONS

Extended European Search Report for European Application No. 15200315.8 dated Jun. 1, 2016.

*Primary Examiner* — Logan Kraft
*Assistant Examiner* — Brian Delrue
(74) *Attorney, Agent, or Firm* — Carlson, Gaskey & Olds, P.C.

(57) ABSTRACT

A vane for a gas turbine engine includes a radially inner platform and a radially outer platform. At least two airfoils extend between the radially inner platform and the radially outer platform. At least two anti-rotation tabs extend axially from the radially outer platform.

17 Claims, 3 Drawing Sheets

(56) References Cited

U.S. PATENT DOCUMENTS

| | | | |
|---|---|---|---|
| 5,176,496 A * | 1/1993 | Correia | F01D 9/042 |
| | | | 415/189 |
| 5,248,240 A * | 9/1993 | Correia | F01D 9/042 |
| | | | 415/191 |
| 5,411,369 A | 5/1995 | Bouchard | |
| 5,597,167 A | 1/1997 | Snyder et al. | |
| 5,846,050 A | 12/1998 | Schilling | |
| 6,332,617 B1 | 12/2001 | Leveaux et al. | |
| 6,699,011 B2 * | 3/2004 | Cot | F01D 9/04 |
| | | | 415/173.1 |
| 6,969,239 B2 | 11/2005 | Grant et al. | |
| 7,258,525 B2 * | 8/2007 | Boeck | F01D 9/042 |
| | | | 415/191 |
| 7,704,042 B2 * | 4/2010 | Brueckner | F01D 9/042 |
| | | | 415/121.3 |
| 7,938,626 B2 | 5/2011 | Forgue et al. | |
| 8,220,150 B2 * | 7/2012 | Pellet | B23P 6/002 |
| | | | 29/889 |
| RE43,928 E * | 1/2013 | Clouse | F01D 17/02 |
| | | | 415/115 |
| 8,419,361 B2 | 4/2013 | Robertson | |
| 8,596,969 B2 | 12/2013 | Chuong et al. | |
| 8,684,674 B2 * | 4/2014 | Chan | F01D 11/001 |
| | | | 415/119 |
| 9,683,459 B2 * | 6/2017 | Aoki | F01D 25/246 |
| 2006/0291998 A1 * | 12/2006 | Dube | F01D 17/02 |
| | | | 415/118 |
| 2009/0246014 A1 * | 10/2009 | Shapiro | F01D 9/042 |
| | | | 415/209.3 |
| 2012/0163993 A1 * | 6/2012 | Levine | B22C 9/10 |
| | | | 416/97 R |
| 2013/0108434 A1 * | 5/2013 | Judet | F01D 9/042 |
| | | | 415/208.2 |
| 2013/0177400 A1 | 7/2013 | Ring | |
| 2013/0259646 A1 * | 10/2013 | Feindel | F01D 21/003 |
| | | | 415/118 |
| 2015/0098829 A1 * | 4/2015 | Baldiga | F01D 11/003 |
| | | | 416/179 |
| 2015/0292342 A1 * | 10/2015 | Ring | F01D 9/041 |
| | | | 415/208.2 |
| 2017/0002675 A1 * | 1/2017 | Lutjen | F01D 9/042 |

FOREIGN PATENT DOCUMENTS

| | | |
|---|---|---|
| EP | 1995409 | 11/2008 |
| EP | 2921652 A4 * | 9/2016 |

* cited by examiner

ANTI-ROTATION VANE

CROSS-REFERENCE TO RELATED APPLICATIONS

This application claims priority to U.S. Provisional Application No. 62/093,835, which was filed on Dec. 18, 2014 and is incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Various components are attached to a static structure on the gas turbine engine, such as vanes, that must be prevented from rotating in a circumferential direction relative to the static structure. In order to prevent the circumferential rotation of the components, some form of engagement between the component and the static structure must be formed.

SUMMARY

In one exemplary embodiment, a vane for a gas turbine engine includes a radially inner platform and a radially outer platform. At least two airfoils extend between the radially inner platform and the radially outer platform. At least two anti-rotation tabs extend axially from the radially outer platform.

In a further embodiment of the above, at least two anti-rotation tabs includes a primary anti-rotation tab and at least one secondary anti-rotation tab. The primary anti-rotation tab is configured to engage at least one anti-rotation protrusion on an engine static structure.

In a further embodiment of any of the above, at least two airfoils includes only two airfoils and the at least two anti-rotation tabs include only one primary anti-rotation tab and only one secondary anti-rotation tab.

In a further embodiment of any of the above, the radially outer platform includes a borescope opening. One of the at least two anti-rotation tabs includes a borescope locating tab.

In a further embodiment of any of the above, the vane includes a vane hook spaced radially outward from at least two anti-rotation tabs for engaging a recess formed in an engine static structure.

In another exemplary embodiment, a gas turbine engine includes an engine static structure that includes a plurality of anti-rotation protrusions. At least one vane includes at least two anti-rotation tabs. At least one of the at least two anti-rotation tabs engages one of the plurality anti-rotation protrusions.

In a further embodiment of any of the above, the vane includes at least two airfoils.

In a further embodiment of any of the above, the vane assembly includes only two airfoils forming a vane.

In a further embodiment of any of the above, at least two anti-rotation tabs includes a primary anti-rotation tab and a secondary anti-rotation tab. The primary anti-rotation tab engages the plurality of anti-rotation protrusions.

In a further embodiment of any of the above, a borescope vane has a borescope opening and a borescope vane identifying tab.

In a further embodiment of any of the above, there is a borescope locator on the engine static structure. The borescope locator allows the borescope vane to be placed adjacent the borescope vane identifying tab and prevents the vane with the secondary anti-rotation tab from being placed adjacent borescope vane identifying tab.

In a further embodiment of any of the above, a blade outer air seal includes a feature for engaging at least one of the primary anti-rotation tab and the secondary anti-rotation tab.

In a further embodiment of any of the above, a blade outer air seal support structure that includes a feature for engaging at least one of the primary anti-rotation tab and the secondary anti-rotation tab.

In a further embodiment of any of the above, at least one vane includes a vane hook spaced radially outward from the pair of anti-rotation tabs for engaging a recess formed in the engine static structure.

In another exemplary embodiment, a method of assembling a gas turbine engine includes locating at least one vane adjacent an engine static structure. The at least one vane includes a primary anti-rotation tab and a secondary anti-rotation tab and it engages the primary anti-rotation tab with at least one anti-rotation protrusion on the engine static structure.

In a further embodiment of any of the above, the method includes engaging the secondary anti-rotation tab with borescope locator to prevent installation of the at least one vane.

In a further embodiment of any of the above, the method includes locating at least one vane adjacent the engine static structure. The secondary anti-rotation tab is a borescope vane identifying tab and at least one vane includes a borescope opening.

In a further embodiment of any of the above, the method includes engaging at least one of the primary anti-rotation tab and the secondary anti-rotation tab with a blade outer air seal.

In a further embodiment of any of the above, the method includes engaging at least one of the primary anti-rotation tab and the secondary anti-rotation tab with a blade outer air seal support structure.

DETAILED DESCRIPTION

Figure 1:
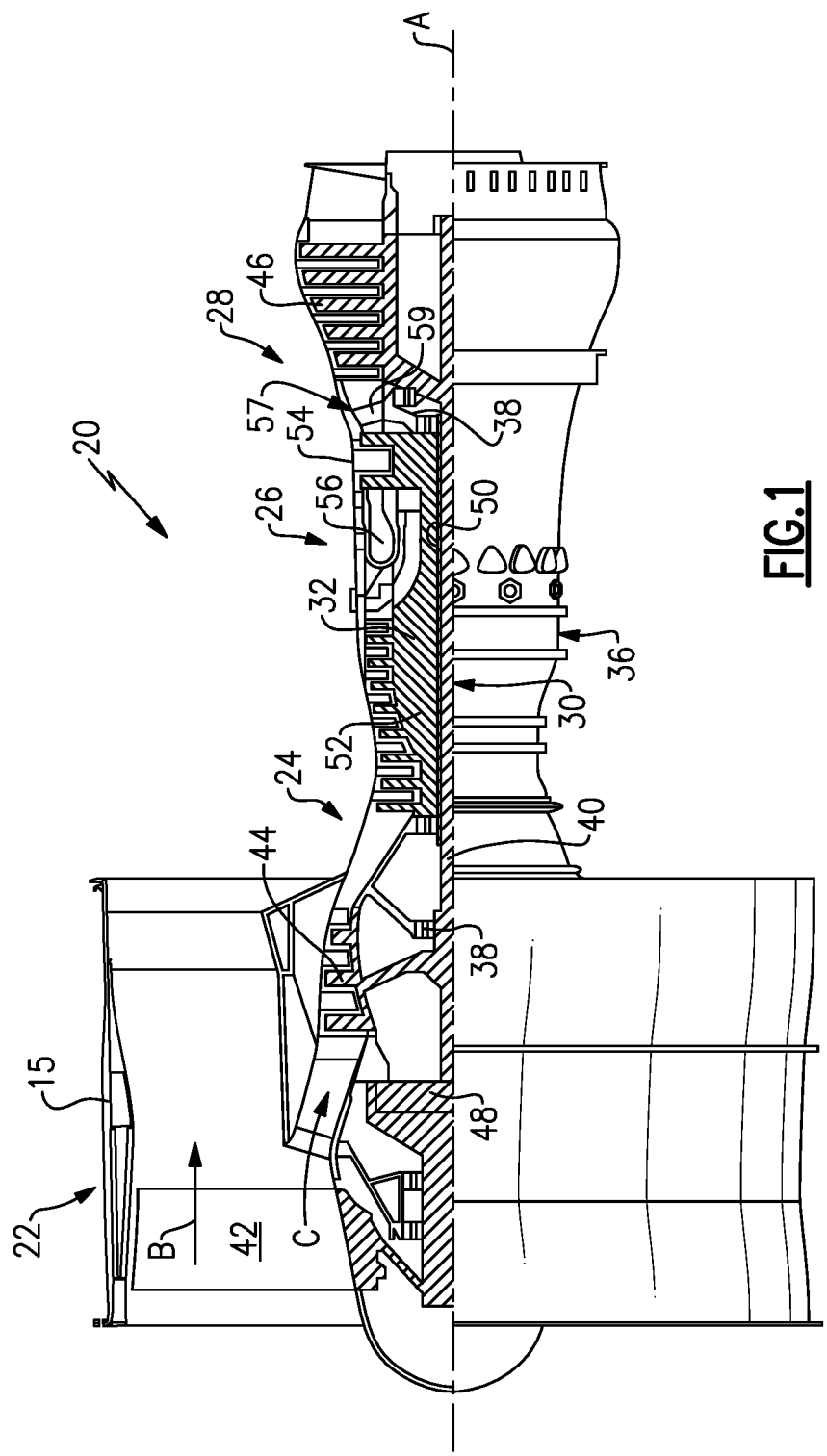
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\,°\,\text{R})/(518.7°\,\text{R})]^{0.5}$. The "Low corrected fan tip speed" as disclosed herein according to one non-limiting embodiment is less than about 1150 ft/second (350.5 meters/second).

Figure 2:
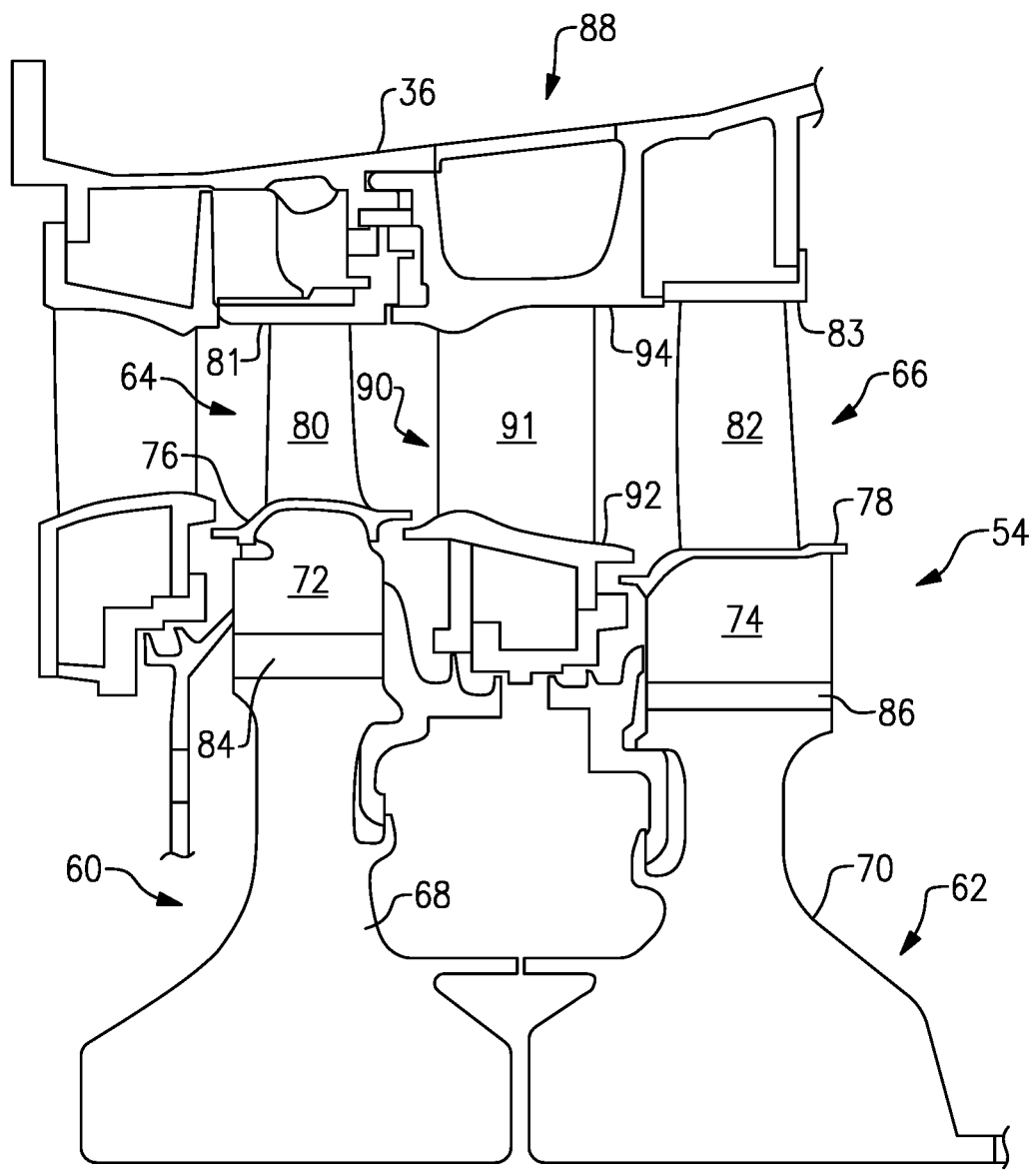
FIG. 2 illustrates a schematic view of an example turbine section of the gas turbine engine.

FIG. 2 illustrates an enlarged schematic view of the high pressure turbine 54, however, other sections of the gas turbine engine 20 could benefit from this disclosure. The high pressure turbine 54 includes a two-stage turbine section with a first rotor assembly 60 and a second rotor assembly 62.

The first rotor assembly 60 includes a first array of rotor blades 64 circumferentially spaced around a first disk 68 and the second rotor assembly 62 includes a second array of rotor blades 66 circumferentially spaced around a second disk 70. Each of the first and second array of rotor blades 64, 66 include a respective first root portion 72 and a second root portion 74, a first platform 76 and a second platform 78, and a first airfoil 80 and a second airfoil 82. Each of the first and second root portions 72, 74 is received within a respective first rim and a second rim 84, 86 of the first and second disk 68, 70. The first airfoil 80 and the second airfoil 82 extend radially outward toward a first and second blade outer air seal (BOAS) assembly 81, 83, respectively.

The first and second array of rotor blades 64, 66 are disposed in the core flow path that is pressurized in the compressor section 24 then heated to a working temperature in the combustor section 26. The first and second platforms 76, 78 separate a gas path side inclusive of the first and second airfoils 80, 82 and a non-gas path side inclusive of the first and second root portions 72, 74.

A shroud assembly 88 within the engine case structure 36 between the first rotor assembly 60 and the second rotor assembly 62 directs the hot gas core airflow in the core flow path from the first array of rotor blades 64 to the second array of rotor blades 66. The shroud assembly 88 includes an array of vanes 90 that each include at least two airfoils 91 that extend between a respective inner vane platform 92 and an outer vane platform 94. The outer vane platform 94 of the vane 90 may at least partially engage the first and second BOAS 81, 83.

Figure 3:
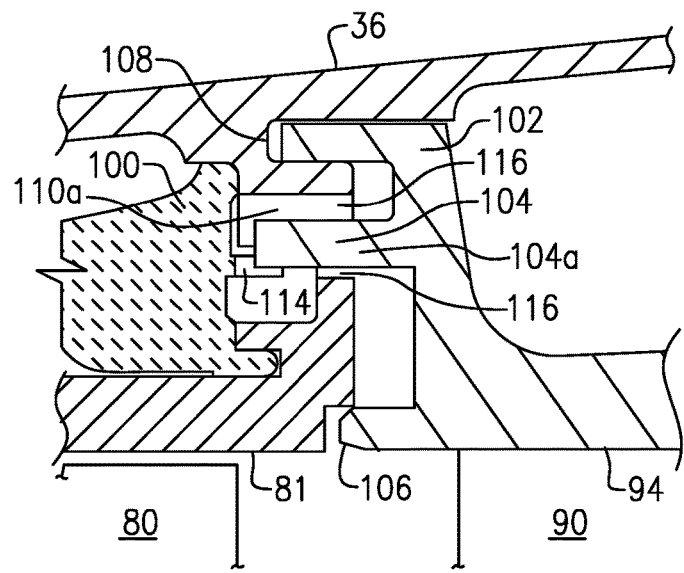
FIG. 3 illustrates an enlarged view of the turbine section.

FIG. 3 illustrates an enlarged view of the region surrounding a leading edge 106 of the outer vane platform 94 of the vane 90. In the illustrated example, the outer vane platform 94 of the vane 90 includes a vane hook 102, at least two anti-rotation tabs 104 (FIG. 4), and the leading edge 106 adjacent the gas path. The vane hook 102 engages a recess 108 formed in the engine static structure 36 to limit radial and axially forward movement of the vane 90 relative to the engine static structure 36.

The anti-rotation tabs 104 includes a primary anti-rotation tab 104a and a secondary anti-rotation tab 104b (FIG. 4) on the vane 90. In the illustrated example, each vane 90 includes a pair of airfoils 91 extending between the outer vane platform 94 and inner vane platform 92, a primary anti-rotation tab 104a and a secondary anti-rotation tab 104b. The primary anti-rotation tab 104a includes a pair of circumferential faces 105 (FIG. 4) that engage corresponding circumferential faces 110a on anti-rotation protrusions 110 that extend radially inward from the engine static structure 36 to prevent the vane 90 from rotating circumferentially during operation. The circumferential faces 110a on the anti-rotation protrusions 110 extend along the axis A. As shown in FIG. 3, the anti-rotation protrusions 110 engage a forward and radially outer portion of the anti-rotation tab 104. Although the anti-rotation protrusions 110 are shown in pairs, only one anti-rotation protrusion 110 could be used to engage the primary anti-rotation tab 104a.

Figure 4:
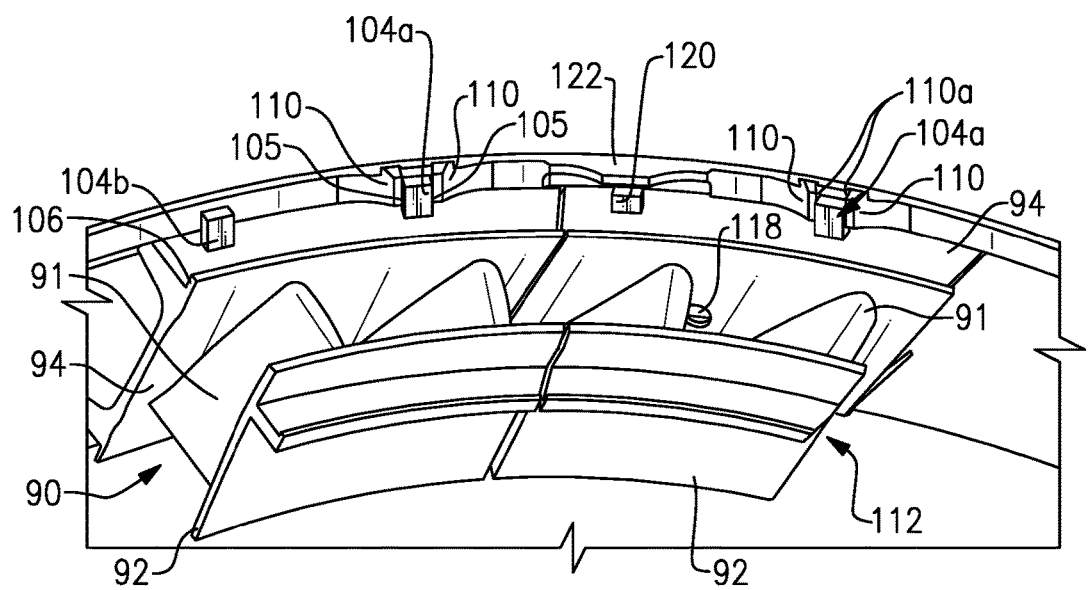
FIG. 4 illustrates a perspective view of a portion of the turbine section.

The engine static structure 36 only includes one of the pairs of anti-rotation protrusions 110 per vane 90 as shown in FIG. 4. The anti-rotation tabs 104 extends from a radially outer portion of the outer vane platform 94 and is located radially inward from the vane hook 102. The anti-rotation tabs 104 extend axially forward from the outer vane platform 94 and include a simple cross section, such as a square or rectangle, to simplify the manufacturing process.

A blade outer air seal support structure 100 and the blade outer air seal 81 also engage at least one of the anti-rotation tabs 104 to prevent circumferential movement of the blade outer air seal support structure 100 and the blade outer air seal 81. As shown in FIG. 3, the blade outer air seal support structure 100 includes a feature 114, such as a pair of tabs (only one shown), that engages corresponding circumferential faces on the primary anti-rotation tab 104a to prevent rotation of the blade out air seal support structure 100. Although the blade outer air seal support structure 100 is only shown engaging the primary anti-rotation tab 104a, a second feature 114, such as a second pair of tabs, on the blade outer air seal support structure 100 could also engage the secondary anti-rotation tab 104b. In the illustrated example, the features 114 engage a forward and radially inner portion of the anti-rotation tab 104.

As shown in FIG. 3, the BOAS 81 includes a feature, such as a pair of tabs (only one shown), that engages corresponding circumferential faces on the primary anti-rotation tab 104a to prevent rotation of the BOAS 81. Although the BOAS 81 is only shown engaging the primary anti-rotation tab 104a, a second feature 116, such as a second pair of tabs, on the BOAS 81 could also engage the secondary anti-rotation tab 104b. In the illustrated example, the features 116 engage a middle and radially inner portion of the anti-rotation tabs 104.

As shown in the illustrated example, the engine static structure 36 includes only one pair of anti-rotation protrusions 110 per vane 90. A borescope locator 122 on the engine static structure 36 is used to locate a borescope vane 112 in a predetermined circumferential location relative to the engine static structure 36.

The borescope vane 112 includes a borescope opening 118 that extends through the outer vane platform 94 to allow for internal inspection of the turbine section 28, a pair of airfoils 91 extending between the outer vane platform 94 and inner vane platform 92, a primary anti-rotation tab 104a and a borescope vane identifying tab 120 The borescope locator 122 prevents the vane 90, which does not include the borescope vane identifying tab 120 and the borescope opening 118, from being placed in a predetermined circumferential location for the borescope vane 112. The borescope locator 122 prevents improper place of the vane 90 in the predetermined circumferential location by engaging the secondary anti-rotation tab 104b and preventing the vane 90 from being installed. The borescope vane 112 includes a borescope vane identifying tab 120 that allows the borescope vane 112 to be installed in the predetermined circumferential location without being prevented by the borescope locator 122. The borescope vane identifying tab 120 is axially shorter than the secondary anti-rotation tab 104b on the vane 90 to allow the borescope vane 112 to be placed in the predetermined circumferential location.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A vane for a gas turbine engine comprising:
a radially inner platform,
a radially outer platform,
at least two airfoils extending between the radially inner platform and the radially outer platform, and
at least two anti-rotation tabs extending axially from a leading edge of the radially outer platform, wherein a vane hook is spaced radially outward from the at least two anti-rotation tabs for engaging a recess formed in an engine static structure.

2. The vane of claim 1, wherein the at least two anti-rotation tabs includes a primary anti-rotation tab and at least one secondary anti-rotation tab, the primary anti-rotation tab is configured to engage at least one anti-rotation protrusion on an engine static structure.

3. The vane of claim 2, wherein the at least two airfoils includes only two airfoils and the at least two anti-rotation tabs include only one primary anti-rotation tab and only one secondary anti-rotation tab.

4. The vane of claim 1, wherein the vane is a borescope vane with the radially outer platform including a borescope opening and one of the at least two anti-rotation tabs defines a borescope locating tab.

5. A gas turbine engine comprising:
an engine static structure including a plurality anti-rotation protrusions; and
at least one vane including at least two anti-rotation tabs along a leading edge of a radially outer platform of the at least one vane, at least one of the at least two anti-rotation tabs engages one of the plurality anti-rotation protrusions and a vane hook spaced radially outward from the pair of anti-rotation tabs for engaging a recess formed in the engine static structure.

6. The vane assembly of claim 5, wherein the vane includes at least two airfoils.

7. The vane assembly of claim 6, wherein the vane assembly includes only two airfoils forming a vane.

8. The gas turbine engine of claim 6, wherein the at least two anti-rotation tabs includes a primary anti-rotation tab and a secondary anti-rotation tab, the primary anti-rotation tab engages the plurality anti-rotation protrusions.

9. The gas turbine engine of claim 8, further comprising a borescope vane having a borescope opening and a borescope vane identifying tab.

10. The gas turbine engine of claim 9, further comprising a borescope locator on the engine static structure, wherein the borescope locator is spaced from the borescope vane identifying tab when the borescope vane is located adjacent the borescope locator and the borescope locator engages the secondary anti-rotation tab on the vane when the vane is located adjacent the borescope locator.

11. The gas turbine engine of claim 8, further comprising a blade outer air seal including a protrusion for engaging at least one of the primary anti-rotation tab and the secondary anti-rotation tab.

12. The gas turbine engine of claim 8, further comprising a blade outer air seal support structure including a protrusion for engaging at least one of the primary anti-rotation tab and the secondary anti-rotation tab.

13. A method of assembling a gas turbine engine comprising:
    locating at least one vane adjacent an engine static structure, wherein the at least one vane includes a primary anti-rotation tab and a secondary anti-rotation tab along a leading edge of a radially outer platform of the at least one vane and a vane hook spaced radially outward from the primary anti-rotation tab and the secondary anti-rotation tab for engaging a recess formed in the engine static structure; and
    engaging the primary anti-rotation tab with at least one anti-rotation protrusion on the engine static structure.

14. The method of claim 13, further comprising engaging the secondary anti-rotation tab with a borescope locator on the engine static structure.

15. The method of claim 13, further comprising a borescope vane adjacent to the at least one vane, locating the at least one vane and the borescope vane adjacent the engine static structure, wherein the borescope vane includes a borescope vane identifying tab and a borescope opening.

16. The method of claim 13, further comprising engaging at least one of the primary anti-rotation tab and the secondary anti-rotation tab with a blade outer air seal.

17. The method of claim 13, further comprising engaging at least one of the primary anti-rotation tab and the secondary anti-rotation tab with a blade outer air seal support structure.

* * * * *